June 4, 1929.  J. T. JANETTE  1,715,840
BEARING
Filed Oct. 30, 1925
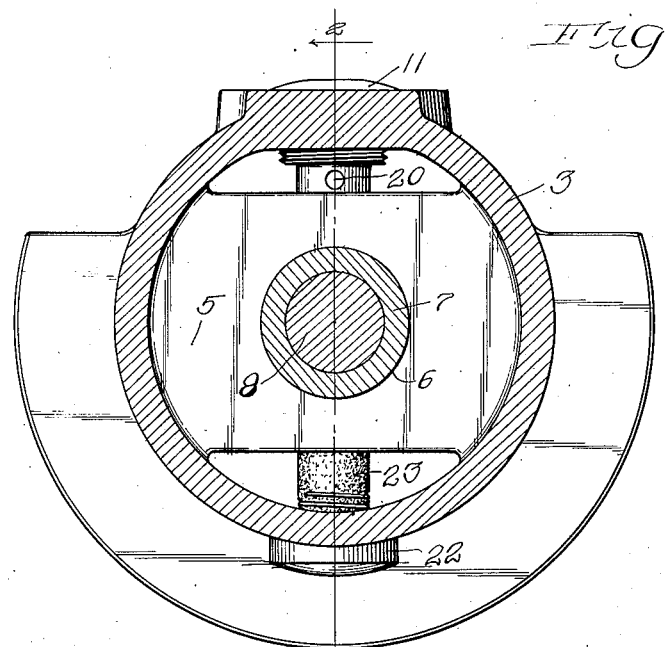
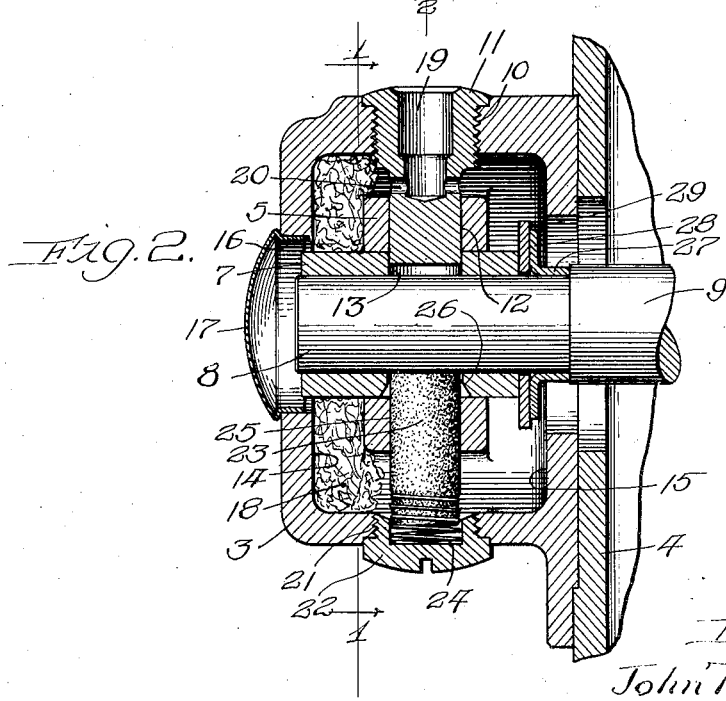
Inventor:
John T. Janette
By Glenn S. Noble
Atty.

Patented June 4, 1929.

1,715,840

UNITED STATES PATENT OFFICE.

JOHN T. JANETTE, OF CHICAGO, ILLINOIS.

BEARING.

Application filed October 30, 1925. Serial No. 65,797.

While the construction of an ordinary bearing may appear a simple matter, it has been found difficult by even those skilled in the art, to provide satisfactory bearings for small high-speed motors or generators such as are in more or less general use. While the present invention may be applicable for general purposes, it is particularly adapted for small motors such as are usually known as "fractional" horse power motors. These motors are in many instances placed on machines which are used by persons not familiar with machinery and are expected to operate for long periods without attention such as oiling or cleaning. For this reason, I have produced the bearing which forms the subject matter of this application and which is intended to give maximum lubrication over a long period of time and to have but little friction or wear.

Other objects of this invention are to provide an improved bearing with novel journal lubricating means; to provide a bearing having means for preventing dirt or dust from reaching the moving parts; to provide a bearing having means tending to prevent the oil from escaping from the bearing housing or from coming in contact with he other parts of the motor; to provide a bearing having a combined self aligning and lubricating mechanism; and to provide such other novel features of construction and improvements in operation as will appear more fully from the following description.

In the accompanying drawings illustrating a preferred form of my invention;

Figure 1 is a sectional view taken on the line 1—1 of Figure 2; and

Figure 2 is a sectional view taken on the line 2—2 of Figure 1.

The bearing housing 3, as shown in these drawings, may be attached to the motor frame 4 in any desired manner or in some instances may be made integrally therewith. The housing 3 is provided with a transverse web or support 5 having a central aperture 6 for the bearing sleeve or bushing 7. The web or support 5 is preferably made relatively narrow so that it engages with the central portion of the sleeve 7, the ends of which project somewhat beyond the web, thereby permitting the sleeve to have sufficient play or "give" so that it is free to align with the journal or bearing portion 8 of the motor shaft 9.

The housing 3 has a threaded hole 10 in the upper portion thereof for receiving a screw or plug 11. The lower end of the plug is preferably solid and passes through a hole 12 in the web 5 and engages with a hole 13 in the sleeve 7 in order to hold the sleeve in proper position.

It will be noted that the web or partition 5 is cut away at the top and bottom, but divides the housing in a general sense into outer and inner connected chambers 14 and 15. The housing 3 is also preferably provided with an aperture 16 having a cap 17 and providing means for introducing any suitably absorbent material 18, such as felt, wool or the like into the chamber 14 and for access to the bearing.

The plug or screw 11 has a central oil hole 19 with one or more lateral passages 20 which open out above the partition 5 so that the oil will pass out into the upper portion of the housing instead of passing directly to the bearing surfaces.

The housing 3 also has a threaded hole 21 for receiving a plug 22 which carries a cylindrical wick 23, which is pressed upwardly by a spring 24. The wick passes through a hole 25 in the web 5 and through a hole 26 in the bearing sleeve 7 and engages with the journal 8.

The shaft 9 has a collar 27 with an outwardly projecting flange 28 which is engaged by a disk 29 preferably made of fibre or other suitable bearing material.

When the oil or lubricant is introduced through the hole 19, it passes out through the lateral passageways 20 into the housing 3 where the major portion will be absorbed by the fibrous packing or absorbent material 18, but any excess will pass down to the bottom of the housing. This lubricant will be absorbed by the wick 23 and will be carried upwardly to the bearing so that the bearing will be constantly lubricated as long as oil is supplied to the housing. It will be noted that when a motor starts in operation, heat will be generated and as the bearings become warm, they will tend to warm the lubricant so that it will pass more freely to the bearing as it is needed. Any excess lubricant which tends to creep inwardly along the journal will be thrown outwardly into the chamber 15 by the centrifugal action of the ring 28 and disk 29 which rotate with the shaft. It will thus be seen that these parts not only serve to protect the commutator armature from oil, but also serve to take up the end thrust of the shaft.

I have found that with this arrangement motors may be run for relatively long periods of time without having to be oiled and furthermore, there is little danger of injury to the bearing by any dirt or the like which may be in the lubricant as particles of this character will be taken out by the fibrous material and wick.

Having thus described my invention which however I do not wish to limit to the exact construction herein shown and described, except as specified in the following claims, what I claim and desire to secure by Letters Patent is:

1. In a bearing of the character set forth, the combination of a housing having a transverse integrally formed supporting member extending from one wall of the housing to the opposite wall and dividing the housing longitudinally into two chambers which are connected by a passageway under the supporting member, a bearing sleeve engaging with a hole in said supporting member, a threaded plug projecting through the housing and supporting member and engaging with said sleeve, said plug having a hole for introducing lubricant into the upper portion of the housing, fibrous material in one of said chambers and a wick projecting upwardly from the lower portion of the housing and adapted to engage with the shaft which engages with said sleeve.

2. The combination of a housing having a transverse partition forming outer and inner chambers which are connected above and below the partition, a bearing sleeve engaging with a hole in said partition, a shaft engaging with said sleeve, a plug projecting through the outer wall of the housing and the partition and engaging with a hole in the sleeve, said plug having an oil inlet passageway leading to the top of the housing, a plug in the bottom of the housing, a spring-pressed wick carried by said plug and projecting upwardly through the partition and sleeve and engaging with the shaft, and fibrous material in the outer chamber.

3. A bearing comprising a housing having a central partition with a hole therethrough, a sleeve in said hole for engagement with a shaft, said sleeve having holes in the top and bottom thereof, a plug extending down through the top of the housing and through the partition and engaging with the top hole in said sleeve, a passageway through the plug leading to the housing, absorbent wool in said housing, and a wick mounted in the lower portion of the housing and projecting upwardly through the bottom hole in said sleeve, the arrangement being such that substantially all of the lubricant must pass through the wick to the bearing.

JOHN T. JANETTE.